UNITED STATES PATENT OFFICE.

VICTOR BERQUIST, OF SEATTLE, WASHINGTON.

DIFFERENTIAL TRANSMISSION.

1,247,494.  Specification of Letters Patent.  Patented Nov. 20, 1917.

Application filed March 21, 1917. Serial No. 156,268.

*To all whom it may concern:*

Be it known that I, VICTOR BERQUIST, a citizen of Canada, residing at Seattle, in the county of King and State of Washington, have invented certain new and useful Improvements in Differential Transmissions, of which the following is a specification.

My invention relates to differential transmissions and more particularly to transmissions which are used on gang plows and the like where the greater part of the load or draft is on one side of the machine, and has for its principal object to provide an improved and novel differential transmission which embodies means for distributing varying proportions of power to two different axles. Another object of my device is to provide a geared transmission which embodies interdependent sets of beveled gears and pinions and means for positively connecting either of said sets selectively to a common driven point. In gang plows and the like, the greater part of the load is generally applied on one side of the longitudinal center line of the machine and therefore requires greater work by the traction wheel on that particular side than it does on the driven wheel on the other side, with the result that the machine tends to slue around and travel corner-wise with considerable slippage. My device is designed to overcome this objection by distributing the power to the traction wheels in an approximate proportion to their load.

Other objects will appear as my invention is more fully explained in the following specifications, illustrated in the accompanying drawings and pointed out in the appended claims.

In the drawings, the figure is substantially a longitudinal cross section of my improved transmission with parts broken away.

Referring more particularly to the drawings, numeral 1 indicates a drive shaft, 2 and 3 the axle shafts and 4 a pinion shaft. Shafts 2 and 3 are arranged at right angles to shaft 1 while shaft 4 lies in the plane of center line shaft 1 and is revolubly mounted in a casing composed of sections 5 and 6 which are securely fastened together. Section 5 of the casing takes bearing upon shaft 2 while section 6 takes bearing upon a sleeve 7 which is secured to shaft 3. Casing section 6 is provided with a beveled gear 8 around its periphery. A beveled pinion 9 which is secured to the end of shaft 1 coöperates with beveled gear 8, thereby transmitting a continuous rotary motion to the said gear and casing members 5 and 8. As shaft 4 takes bearing diametrically of the casing, it will be understood that this shaft also travels with the casing. Beveled pinions 10 and 11 are loosely mounted upon shaft 4 and are themselves tied together in pairs by means of connections 12. Pinions 10 engage beveled gears 13 and 14, one on either side, while pinions 11 engage a beveled gear 15. The gear 13 is positively keyed to shaft 2 and gear 15 is loosely mounted upon shaft 3 and gear 14 is loosely mounted upon sleeve 7. It will therefore be apparent that the gears 14 and 15 are normally loose while the gear 13 is normally fixed. Sleeve 7 is slotted as at 16 to receive sliding clutch bars 17 which are provided with T shaped dogs 18 at their inner ends. The heads of the T shaped dogs are adapted to engage, selectively, recesses 19 and 20 in gears 14 and 15 respectively, thereby fixedly securing the said sleeve to one or the other of the gears 14 or 15. I provide a shift ring 21 and lever 22 for moving the dogs 17 in slots 16 in order that the dogs may be brought into engagement with either the recesses 19 or 20, as the case may be. As the gears 13 and 14 are of the same pitch diameter, it will be understood that when the dogs 17 are in engagement with the recesses 19 that equal power is being distributed to each of the shafts 2 and 3. Under this condition there is normally very little movement between the pinions 10 and the gears 13 and 14. When the dogs 17 have been shifted until they engage recesses 20 in gear 15 it will be apparent that the gears 13 and 15 are now locked rotatively together by means of the pinions 10 and 11 which are themselves positively connected. As the pitch diameters of the gears 13 and 15 are different it will be apparent that if the said gears are to remain in approximately fixed relationship to each other that a greater load must be applied to shaft 2 than is applied to shaft 3, otherwise the gears 13 and 15 will have some rotation with respect to each other as their lever arms, with respect to pinions 10 and 11, are different. From the foregoing it will be evident that either the speed or load of the shafts 2 and 3 must be different in order to maintain the equilibrium between the gears 13 and 15. I take advantage of this V. BERQUIST.
DIFFERENTIAL TRANSMISSION.
APPLICATION FILED MAR. 21, 1917.
1,247,494.
Patented Nov. 20, 1917.
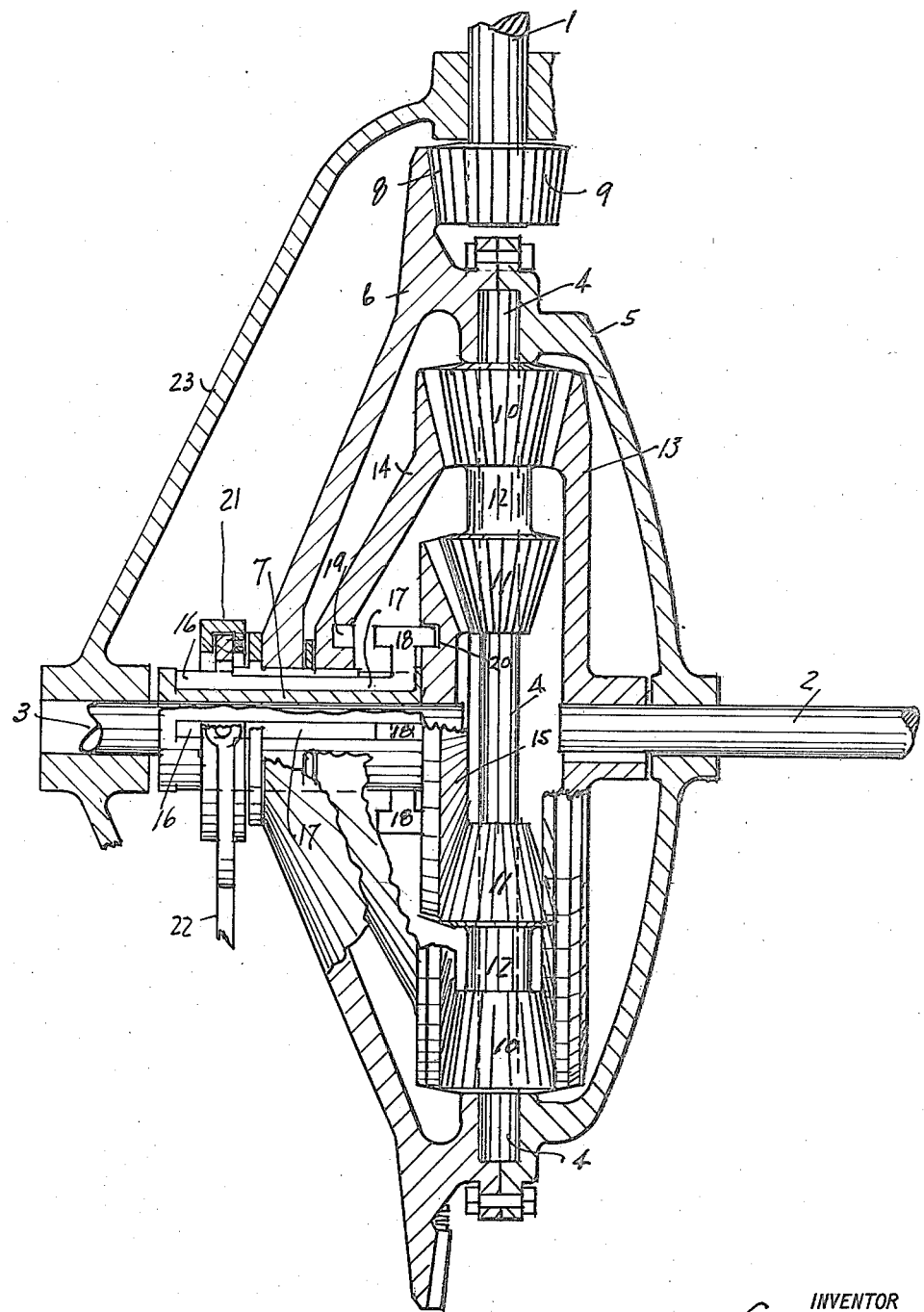
INVENTOR
Victor Berquist
BY
Fred P. Yorn
ATTORNEY